Patented Feb. 17, 1931

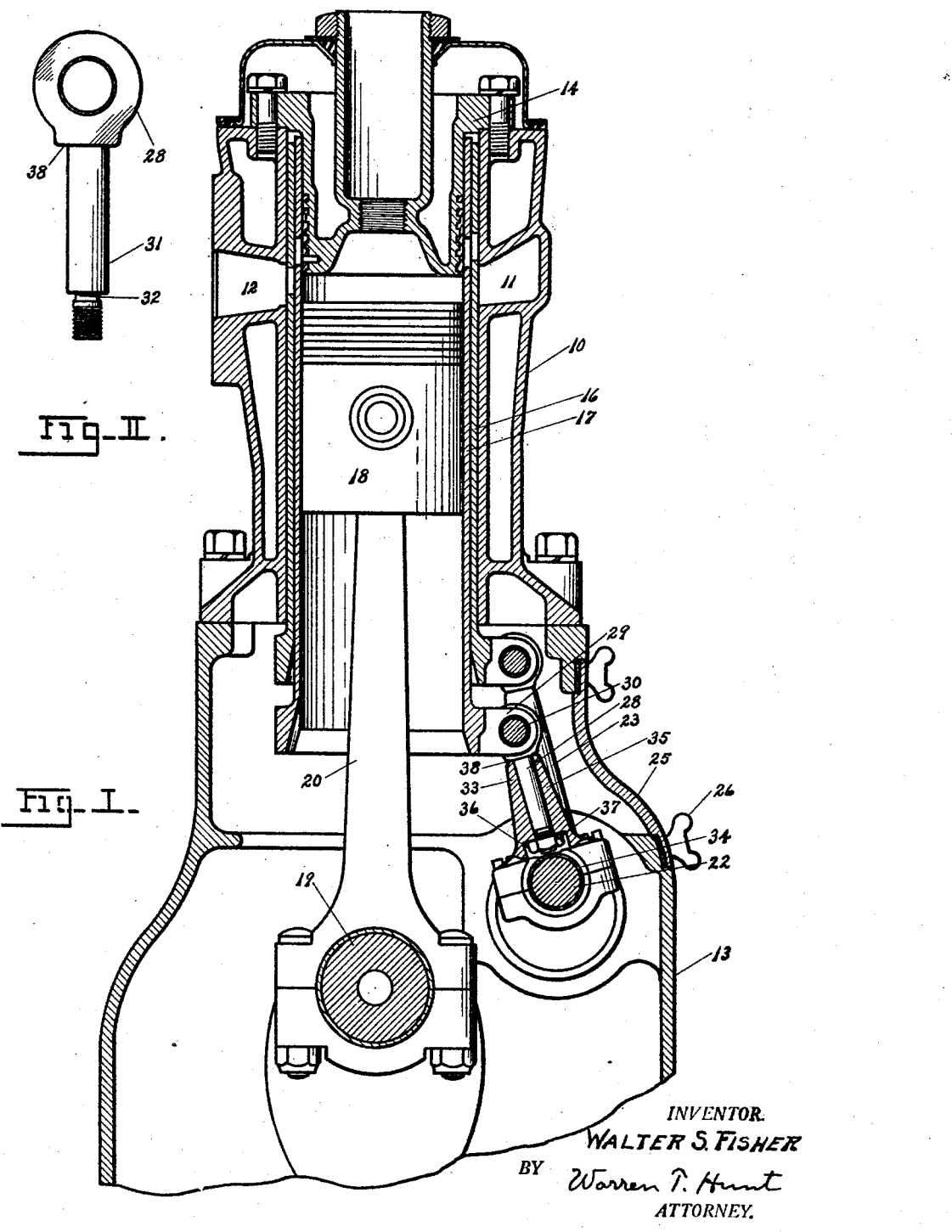

1,792,972

UNITED STATES PATENT OFFICE

WALTER S. FISHER, OF TOLEDO, OHIO, ASSIGNOR TO THE WILLYS OVERLAND COMPANY, OF TOLEDO, OHIO, A CORPORATION OF OHIO

CONNECTING-ROD CONSTRUCTION

Application filed June 5, 1928. Serial No. 283,112.

My invention relates to connecting rods and it has particular application to connecting rods for valve sleeves, commonly employed in sleeve valve engines.

As is a characteristic of all internal combustion engines an inadequate supply of lubrication on any reciprocating members, subjected to elevated temperatures during their operation, produces sticking and tieing up of the members. In the case of sleeve valve engines, such a condition may produce more disastrous results than in poppet valve engines because of the greater mass undergoing reciprocative movement as well as the nature of the mechanical elements undergoing such movement. Thus, in the case of poppet valve engines a disabled valve usually produces only a disabled cylinder, whereas in the case of sleeve valve engines a disabled valve sleeve often renders the whole engine inoperative.

It is one object of this invention to provide a construction which is adapted to localize both the point of failure and any effects which are directly attributable to such failure.

It is a further object of this invention to provide a sleeve valve engine which is not totally disabled as the result of tieing up of one of the sleeves and as a corollary to this object, the invention is aimed to minimize the destructive effects resulting from the tieing up of a sleeve.

It is an additional object of the invention to provide a sleeve valve engine in which the point of failure is restricted to the connecting rod and to afford a combined crank case and connecting rod construction which will enable one to replace any such rods that may fail without dismantling the entire engine.

These, together with other objects, will become more apparent to those skilled in the art after a consideration of the drawings and the description setting forth in detail an embodiment of my invention which may be preferred.

Figure I is a cross sectional view of a sleeve valve engine of the Knight class, in which a connecting rod of my design is incorporated; and Fig. II is a detailed view of the male member of my improved connecting rod.

In its essentials, the engine includes a cylinder block 10 having intake and exhaust ports, 11 and 12 respectively, that is supported by a crank case 13. A cylinder head 14 is bolted to the top of the cylinder block and is adapted to receive a spark plug in its central portion. Within the cylinder a pair of concentric telescoping sleeves 16 and 17 are disposed, which are provided with ports which are co-operatively situated with respect to ports in the cylinder. A piston 18 reciprocates within the inner sleeve and is connected to a crank shaft 19 that is rotatively mounted in the crank case, by a connecting rod 20. The sleeves which are in reciprocative relation with respect to the piston and each other are actuated from a common eccentric shaft 22, which is likewise rotatively disposed in the crank case, through individual connecting rods 23. For the purpose of examination and repair, the portion of the crank case adjacent sleeve connecting rods is provided with an aperture and a removable cover 25 therefor, which is secured in position by means of thumb screws 26.

The connecting rod may be secured to the sleeve and cam shaft in any suitable manner.

The rod itself consists of two major elements; a male member 28 pivotally secured to a lug 29 formed on the sleeve, by means of a sleeve pin 30 which extends through and is fitted to apertures in the lug and the driving member. In addition to the aperture for the pin 30 the male member includes a shank portion 31 which is threaded at its end; adjacent the threaded portion, the shank is of reduced diameter 32 of a predetermined strength which confines failure of the reciprocative unit to the reduced shank portion. The other major element is a female member 33 and includes in addition to a bearing portion 34, a hollow elongated sleeve portion 35 adapted to receive the shank of the male member 31. The opening in member 33 extends through the elongate portion, as well as the bearing, and terminates in an enlargement 36 immediately adjacent the bearing. The shank 31 is fitted in slidable relation with the sleeve portion of the female member and the two members are secured in their normal relative positions by means of a nut 37 which is disposed in the enlargement 36. The nut holds the telescoping members together, whereby the extremity of the female member is firmly abutted against a shoulder 38 on the male member. The assembly of these members may be accomplished before the bearing sections of the member are united. If desired, other means of securing the male and female members in a fixed position may be employed. It will be noted, however, that the portion of the shank which is of reduced cross sectional area is included in the train of elements which transmits the force for actuating the sleeve. It will also be observed that in case of failure at this point, the two members remain in slidable relation, the female member under such circumstances forming a guide for the shank portion of the other member. The length of the shank member and that of the hollow portion of the female member is such that the throw of the eccentric will never exceed the combined length of the two members.

By practicing the present invention any seizure of the sleeves will produce a failure at the point of predetermined strength. After such failure the reciprocative movement produced by the eccentric rod will be taken up by the telescoping action between the connecting rod members. The one member being guided by the other, eliminates any danger of damaging the crank case and cylinder by reason of a free, uncontrolled movement of any of the reciprocating parts. Furthermore, the eccentric shaft may continue to operate without the danger of seriously damaging the engine. When a failure occurs and it would ordinarily be necessary to dismantle the engine, it is possible to replace the rod by removing the inspection plate 25, which affords sufficient access to the parts.

Although there is illustrated and described but a single embodiment of my invention, it will be apparent to those skilled in the art, that the principles are not so limited but that they may be extended to include other embodiments without departing from the scope thereof and I desire, therefore, that it be limited only as indicated in the appended claims.

I claim:

1. A connecting rod for transmitting reciprocatory movement, comprising a pair of members adapted to be maintained in slidable telescoped relation, one of said members including an integral weakened portion adapted to locate the point of failure of the connecting rod, and means for maintaining a relative fixed position between the members under normal operating conditions, said means being positioned whereby the forces transmitted through the connecting rod pass through the weakened portion.

2. A connecting rod for transmitting reciprocatory movement comprising a pair of members disposed in slidable telescoping relation in respect to each other the extent of the telescoping effect being greater than the throw of the connecting rod, one of said members having an integral weakened portion adapted to locate the point of failure, and means for maintaining a fixed relative position between the members during normal operating conditions, said means being so positioned as to subject the weakened portion to the force transmitted through the rod.

3. A connecting rod for transmitting reciprocatory movement, comprising a pair of male and female members disposed in relatively slidable telescoping relation, said male member being provided with an integral portion adapted to localize the point of failure of the rod thereto, said female member including a recessed portion, means disposed in said recessed portion for maintaining a relatively fixed position between the members under normal operating conditions, the throw of said connecting rod being less than the throw of the telescoping members.

4. A connecting rod comprising a hollow shank having a bearing boss at one end thereof, a rod telescoped within said shank and having a bearing boss at its free end, an integral part of said rod being weakened to break under a pre-determined stress, and means for normally securing said rod within said shank so arranged that stress applied to one bearing boss is transmitted to the other through said weakened portion.

5. In a pitman, a rod having a bearing boss at one end, a threaded portion at the other end, a shank portion, and a portion of reduced diameter between said shank portion and the threaded portion.

6. In a pitman, a rod having a bearing boss at one end, a shank portion, a threaded portion at the other end, and a portion of reduced diameter between said shank portion and the threaded portion and adjacent said threaded portion.

7. A connecting rod comprising a shank portion having a bearing boss at one end and an opening extending axially through said shank said opening being enlarged adjacent said bearing boss to form a shoulder, a rod telescoped within said shank and having a bearing boss at its free end, a threaded portion at its opposite end, and a portion of reduced diameter between said ends and adjacent said threaded portion, and a nut on said threaded portion seated against said shoulder.

In testimony whereof, I affix my signature.

WALTER S. FISHER.